US012578017B2

(12) United States Patent
Yasuda

(10) Patent No.: US 12,578,017 B2
(45) Date of Patent: Mar. 17, 2026

(54) PISTON RING

(71) Applicant: NTN CORPORATION, Osaka (JP)

(72) Inventor: Ken Yasuda, Mie (JP)

(73) Assignee: NTN CORPORATION, Osaka (JP)

( * ) Notice: Subject to any disclaimer, the term of this patent is extended or adjusted under 35 U.S.C. 154(b) by 94 days.

(21) Appl. No.: 18/278,175

(22) PCT Filed: Mar. 2, 2022

(86) PCT No.: PCT/JP2022/008801
§ 371 (c)(1),
(2) Date: Aug. 21, 2023

(87) PCT Pub. No.: WO2022/186258
PCT Pub. Date: Sep. 9, 2022

(65) Prior Publication Data
US 2024/0125386 A1 Apr. 18, 2024

(30) Foreign Application Priority Data

Mar. 3, 2021 (JP) ................................ 2021-033973
Aug. 11, 2021 (JP) ................................ 2021-131224

(51) Int. Cl.
*F16J 9/26* (2006.01)
*F04B 39/00* (2006.01)
*F16J 9/28* (2006.01)

(52) U.S. Cl.
CPC ................ *F16J 9/26* (2013.01); *F04B 39/00* (2013.01); *F16J 9/28* (2013.01)

(58) Field of Classification Search
CPC .................. F16J 9/28; F16J 9/26; F04B 39/00
See application file for complete search history.

(56) References Cited

U.S. PATENT DOCUMENTS 5,934,680 A 8/1999 Kakehi et al.
10,465,750 B2 * 11/2019 Tada ..................... F16C 33/201
(Continued)

FOREIGN PATENT DOCUMENTS

CN 109983073 A 7/2019
JP 10-61777 A 3/1998
(Continued)

OTHER PUBLICATIONS

Machine translation of JP 2020-180600 A dated Nov. 5, 2020.
(Continued)

*Primary Examiner* — Eugene G Byrd
(74) *Attorney, Agent, or Firm* — Hedman & Costigan, P.C.; James V. Costigan; Kathleen A. Costigan

(57) ABSTRACT
To provide a piston ring having superior wear resistance and causing less wear damage of a cylinder. A piston ring 1 is used in a reciprocating compressor that compresses gas. The piston ring 1 is formed of a resin composition containing polyetheretherketone resin as a main component. The melt viscosity of the polyetheretherketone resin at the shear rate of 1,000/s and the temperature of 400° C. is 200-550 Pa·s based on a measuring method defined in ISO 11443. The resin composition contains 5-25 vol % of carbon fiber and 5-25 vol % of a solid lubricant, relative to the whole of the resin composition. The solid lubricant includes at least one of PTFE resin and graphite.

2 Claims, 5 Drawing Sheets

(56) References Cited

U.S. PATENT DOCUMENTS

| 11,519,504 | B1 * | 12/2022 | McBride ................. F03C 1/002 |
| 2002/0168506 | A1 | 11/2002 | Ishii |
| 2014/0021686 | A1 * | 1/2014 | Takahashi ............... F16J 9/203 |
| | | | 277/489 |
| 2015/0204383 | A1 | 7/2015 | Ishii et al. |
| 2017/0211560 | A1 * | 7/2017 | Ishii ................... F04B 27/1072 |
| 2020/0056030 | A1 | 2/2020 | Thurnherr |
| 2021/0156371 | A1 * | 5/2021 | Kanei ........................ F16J 9/16 |
| 2021/0277879 | A1 * | 9/2021 | Lisle ...................... F16K 15/12 |
| 2022/0074450 | A1 * | 3/2022 | Bekisli ....................... F16J 9/26 |
| 2023/0087184 | A1 * | 3/2023 | Onodera .............. F04C 27/005 |
| | | | 417/437 |
| 2023/0332687 | A1 * | 10/2023 | Baumann ........... F04B 39/0005 |

FOREIGN PATENT DOCUMENTS

| JP | 2002-081551 | A | 3/2002 |
| JP | 2002-322988 | A | 11/2002 |
| JP | 2007-145934 | A | 6/2007 |
| JP | 2013-155846 | A | 8/2013 |
| JP | 2014-214672 | A | 11/2014 |
| JP | 2019-007414 | A | 1/2019 |
| JP | 6533631 | B | 6/2019 |
| JP | 2019-533788 | A | 11/2019 |
| JP | 2020180600 | A | * 11/2020 | ............. F04B 15/00 |
| KR | 2019-0101958 | A | 9/2019 |
| WO | 2018/073033 | A1 | 4/2018 |

OTHER PUBLICATIONS

Machine translation of JP 6533631 B dated Jun. 19, 2019.
Machine translation of JP 2019-533788 A dated Nov. 21, 2019.
Machine translation of JP 2013-155846 A dated Aug. 15, 2013.
Machine translation of JP 2002-322988 A dated Nov. 8, 2002.
Machine translation of JP 2007-145934 A dated Jun. 14, 2007.
Machine translation of Abstract of CN 109983073 A dated Jul. 5, 2019.
Machine translation of Abstract of KR 2019-0101958 A dated Sep. 2, 2019.
Machine translation of JP 10-61777 A dated Mar. 6, 1998.
Machine translation of JP 2014-214672 A dated Nov. 17, 2014.
Machine translation of JP 2002-081551 A dated Mar. 22, 2002.
Machine translation of JP 2019-007414 A dated Jan. 17, 2019.
Supplementary European Search Report in the corresponding application mailed Jan. 16, 2025.

* cited by examiner

PISTON RING

TECHNICAL FIELD

The present invention relates to a piston ring of a recip-rocating compressor that compresses gas, in particular a piston ring of a hydrogen gas reciprocating compressor used in a hydrogen station.

BACKGROUND ART

Generally, a reciprocating compressor has a structure including a piston and a cylinder. The reciprocating com-pressor is used for compressing fluid by reciprocating the piston relative to the cylinder. In such a reciprocating compressor, in order to seal the fluid in a gap between the piston and the cylinder, an annular piston ring is generally employed. The piston ring is mounted to an annular groove formed on the piston. In this case, an outer peripheral surface of the piston ring is in contact with an inner peripheral surface of the cylinder and a side surface of the piston ring is in contact with a side surface of the annular groove, so that the fluid is sealed.

In recent years, the reciprocating compressor is also used as a hydrogen gas reciprocating compressor used in a hydrogen station. The hydrogen gas reciprocating compres-sor needs to compress the hydrogen gas to a filling pressure for a fuel cell vehicle, so that a compressing mechanism in the compressor is used under a severe condition. Thus, the piston ring of the hydrogen gas reciprocating compressor is required to further improve its durability, heat resistance, sealing performance, and wear resistance.

As such a piston ring, a resin piston ring having improved wear resistance has been known. For example, Patent Docu-ment 1 discloses a resin piston ring that contains polytet-rafluoroethylene (PTFE) resin, polyetheretherketone (PEEK) resin, and polyimide (PI) resin and does not contain polyphenylene sulfide (PPS) resin, wherein a total amount of the PTFE resin and one of the PEEK resin and the PI resin is 50 mass % or more relative to the whole mass. Patent Document 1 discloses that the tensile strength of the piston ring is set in a range of 15-100 MPa, so that the sealing performance is maintained for a long period of driving time compared to a piston ring of which the tensile strength is out of the above-described range.

Patent Document 2 discloses a resin piston ring that is disposed on one of a piston member and a cylinder liner and is configured to slide relative to the other one (a slid member) of the piston member and the cylinder liner. Patent Document 2 discloses that non-crystalline carbon film is formed on both sliding surfaces of the piston ring and the slid member, so that a replacement lifetime due to the wear of the piston ring can be extended. In the non-crystalline carbon film, the content of carbon in the surface portion is larger than the content of carbon in the inside portion.

PRIOR ART DOCUMENT

Patent Document

Patent Document 1: JP 2020-180600 A
Patent Document 2: JP 6533631 B

SUMMARY OF THE INVENTION

Problems to be Solved by the Invention

In Patent Document 1, materials of the piston ring, or the compounding rates of the PTFE resin and the PEEK resin and the compounding rates of the PTFE resin and the PI resin are not disclosed. Patent Document 2 discloses that the PTFE resin, the PEEK resin, or the PI resin is employed as the resin of the piston ring and, for example, the PPS resin or molybdenum disulfide is compounded as an additive. However, the compounding rates thereof are not disclosed. Thus, there is still room for improvement in wear resistance by employing appropriate composition of the resin piston ring. Further, it is also required to improve the wear of the mating material such as the cylinder that slides on the piston ring.

An object of the present invention is, in order to solve such problems, to provide a piston ring having superior wear resistance and causing less wear damage of a cylinder.

Means for Solving the Problems

A piston ring according to the present invention is used in a reciprocating compressor that compresses gas. The piston ring is formed of a resin composition containing PEEK resin as a main component. The melt viscosity of the PEEK resin at the shear rate of 1,000/s and the temperature of 400° C. is 200-550 Pa·s based on a measuring method defined in ISO 11443. Here, the melt viscosity is not the melt viscosity of the resin composition but the melt viscosity of the PEEK resin itself. Further, in the present invention, "gas" denotes general gas, which also includes gaseous fuel or the like.

The resin composition may contain 5-25 vol % of carbon fiber and 5-25 vol % of a solid lubricant, relative to the whole of the resin composition. The solid lubricant may include at least one of PTFE resin and graphite.

The average fiber length of the carbon fiber may be 20-200 μm.

The reciprocating compressor may be configured as a hydrogen gas reciprocating compressor that compresses hydrogen gas. Further, the resin composition may not con-tain PPS resin.

The piston ring may be a heat-treated body of an injec-tion-molded body of the resin composition. The content of sulfur element in the heat-treated body may be smaller than the content of the sulfur element in the injection-molded body.

The piston ring may have an endothermic peak due to heat hysteresis in a range of 150-330° C. in a temperature increasing process of the differential scanning calorimetry.

The content of the sulfur element in the piston ring may be 250 ppm or less.

Effect of the Invention

The piston ring according to the present invention is formed of the resin composition containing the PEEK resin as a main component, and the melt viscosity of the PEEK resin at the shear rate of 1,000/s and the temperature of 400° C. is 200-550 Pa·s based on a measuring method defined in ISO 11443. Accordingly, this configuration can provide a piston ring having superior wear resistance under a condi-tion of reciprocatingly sliding and causing less wear damage of a mating material.

The resin composition contains 5-25 vol % of the carbon fiber and 5-25 vol % of the solid lubricant (at least one of the PTFE resin and the graphite), relative to the whole of the resin composition. According to this configuration, superior friction and wear performance of the resin composition can be obtained even in a compressor without a lubricant such as oil.

The carbon fiber is short fiber of which the average fiber length is 20-200 μm. According to this configuration, the wear damage of the mating material is further decreased.

In the hydrogen gas reciprocating compressor, a sulfur component in the piston ring might be gasified in the compression process and introduced into the compression gas (hydrogen gas). When such compression gas is filled into the fuel cell vehicle, the compression gas might affect a fuel cell. However, since the resin composition does not contain the PPS resin, the sulfur component derived from the PPS resin can be prevented from being introduced into the compression gas. The piston ring according to the present invention has superior wear resistance caused by the above-described resin composition even that does not contain the PPS resin, so that the piston ring is favorably applied to a hydrogen gas compressor for which the wear resistance is required, in particular at high temperature and high pressure and under a non-lubricating condition.

Further, the piston ring is formed of the heat-treated body of the injection-molded body of the resin composition, and the content of the sulfur element in the heat-treated body is smaller than the content of the sulfur element in the injection-molded body. This configuration can decrease generation of outgas that contains the sulfur element (sulfur containing gas) generated in hydrogen atmosphere, and thus the piston ring is favorably applied to, in particular, a hydrogen gas reciprocating compressor. In a case in which the heat treatment is executed in atmosphere, the heat treatment in special atmosphere such as exposure to the hydrogen atmosphere (a desulfurizing treatment) as disclosed in, for example, Patent Document 2, is not necessary, so that cost can be decreased.

MODE FOR CARRYING OUT THE INVENTION

The present inventors conducted a study, in particular, for improving wear resistance of a piston ring. As a result, the present inventors found that the wear resistance is remarkably improved by setting the melt viscosity of the PEEK resin used as a base resin of the piston ring, in a specific range. The present invention is derived from such knowledge.

Figure 1:
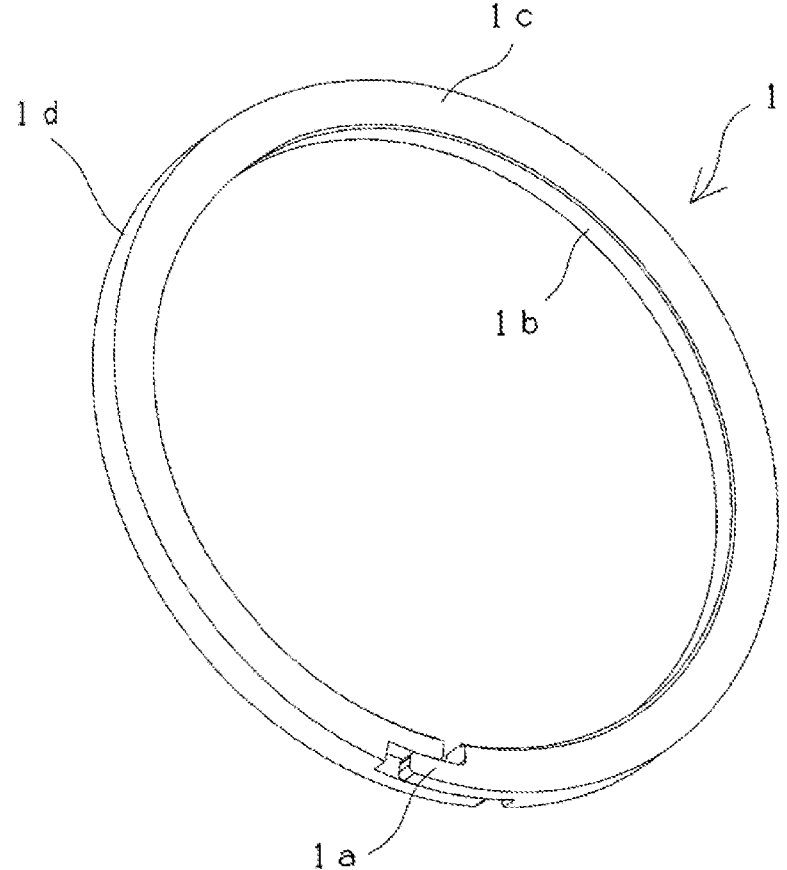
FIG. 1 is a perspective view of an example of a piston ring according to the present invention.

Examples of a piston ring according to the present invention and a reciprocating compressor to which the piston ring is applied are described with reference to FIGS. 1 and 2. FIG. 1 is a perspective view of an example of the piston ring according to the present invention. As shown in FIG. 1, a piston ring 1 is an annular body having a substantially rectangular section. Each of corner portions between a ring inner peripheral surface 1b and ring side surfaces 1c may be chamfered in a linear or curved manner, or alternatively, in a case in which a seal ring is formed by injection molding, a stepped part serving an ejecting portion from a molding die may be formed on the corner portion.

The piston ring 1 is a cut-type ring having one abutment 1a and is configured to be radially enlarged using its elastic deformation so as to be mounted to an annular groove of a piston. Since the piston ring 1 has the abutment 1a, the piston ring 1 is radially enlarged due to pressure of gas when in use, so that an outer peripheral surface 1d of the piston ring 1 adheres to an inner peripheral surface of the cylinder. The shape of the abutment 1a may be, but not especially limited thereto, a straight cut or an angle cut, however a complex stepped cut as shown in FIG. 1 is preferable because of its superior sealing performance.

The piston ring according to the present invention is not limited to a piston ring formed of a single member as shown in FIG. 1. Thus, the piston ring according to the present invention may be an annular piston ring formed by combining plural members.

Figure 2:
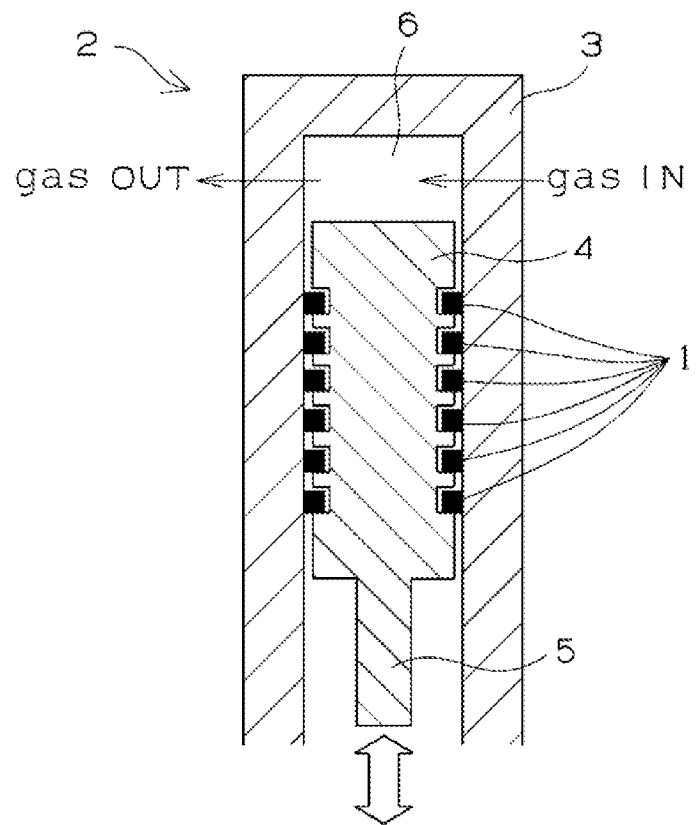
FIG. 2 is a sectional view of an example of a reciprocating compressor using the piston ring according to the present invention.

FIG. 2 is a sectional view of an example of the reciprocating compressor using the piston ring according to the present invention. A compressing mechanism 2 of the reciprocating compressor is formed by a cylinder 3 and a piston 4. The piston 4 is connected to a piston rod 5. A plurality of annular grooves for allowing the piston ring 1 to be mounted thereto is formed on an outer peripheral surface of the piston 4. The piston ring 1 is radially enlarged due to its elastic deformation so as to be mounted to each annular groove. The number of the piston rings to be mounted to the piston is not especially limited. In the example shown in FIG. 2, six seal rings are mounted. Gas is introduced into a compression chamber 6 and is compressed by the piston 4 reciprocating relative to the cylinder 3, and then the gas is exhausted outside.

In the present invention, the gas to be compressed by the reciprocating compressor is not especially limited. An example of the gas includes hydrogen gas. A hydrogen gas reciprocating compressor that compresses hydrogen gas is installed in a hydrogen station and is used for filling hydrogen gas into fuel cell vehicles or hydrogen vehicles.

A resin composition employed in the piston ring according to the present invention is now described.

The piston ring according to the present invention is formed of a resin composition containing PEEK resin as a base resin. In the present invention, the melt viscosity of the PEEK resin at the shear rate of 1,000/s and the temperature of 400° C. is 200-550 Pa·s based on a measuring method defined in ISO 11443. The melt viscosity is determined by the average molecular weight and the molecular distribution of the PEEK resin. Generally, the melt viscosity is higher as the molecular weight is larger. The PEEK resin in the above-described range may be employed. Examples of the PEEK resin as a commercially available product include 380P, 450P and 650P produced by Victrex Japan Inc. In a case in which the melt viscosity is less than 200 Pa·s, the wear resistance of the piston ring used in the reciprocating compressor is insufficient. Further, in a case in which the melt viscosity is more than 550 Pa·s, the piston ring is hard to be formed by means of injection molding, which is unfavorable in view of cost. The melt viscosity is preferably 270-550 Pa·s, more preferably 350-550 Pa·s, and further more preferably 350-500 Pa·s.

The PEEK resin of which a residual amount of diphenyl sulfone used as a solvent in polymerization is small may be preferably employed. In a case in which the residual amount of the diphenyl sulfone is large, sulfur containing gas (for example, hydrogen sulfide ($H_2S$)) might be caused easily when used as the piston ring. In the hydrogen gas reciprocating compressor, in a case in which the hydrogen gas after compressed contains a sulfur component, performance of the fuel cell might be deteriorated. Thus, the content of the sulfur element in the piston ring is required to be small. Accordingly, it is preferable that the residual amount of the diphenyl sulfone in the PEEK resin is small.

Ina case in which the piston ring according to the present invention is formed by injection-molding the PEEK resin composition or formed by machining an injection-molded component, the maximum temperature in the cylinder of the injection molding machine is preferably 380° C. or more, which is higher than the boiling point of diphenyl sulfone (379° C.). The pellet of the PEEK resin composition employed in the injection molding may contain recycled materials formed of crushed sprue and/or runner caused in the injection molding. The number of heat hystereses applied to the recycled material is larger than a virgin material, so that it is advantageous for eliminating the diphenyl sulfone that the pellet contains the recycled material.

The resin composition employed in the present invention contains preferably 50-90 vol % of the PEEK resin, more preferably 60-90 vol % of the PEEK resin, further more preferably 70-80 vol % of the PEEK resin, relative to the whole of the resin composition. The above-described PEEK resin may combine any PEEK resins having different melt viscosities, however the melt viscosity of the combined PEEK resin needs to fulfil the range of 200-550 Pa·s.

The resin composition contains preferably 5-25 vol % of carbon fiber relative to the resin composition. In a case in which the carbon fiber is less than 5 vol %, the wear resistance is hardly improved, while in a case in which the carbon fiber is more than 25 vol %, the melt viscosity of the resin composition is too high for the injection molding. The content of the carbon fiber is more preferably 10-20 vol %.

The average fiber length of the carbon fiber is not especially limited, however the carbon fiber is preferably a short fiber having the average fiber length of 20-200 μm. In a case in which the average fiber length is less than 20 μm, the wear resistance is hardly improved, while in a case in which the average fiber length is more than 200 μm, the carbon fiber that is broken during the sliding easily enters between the sliding surfaces, which causes the damage or wear of the cylinder or the like. The average fiber length in this disclosure is the number-average fiber length.

Any of pitch based carbon fiber and PAN based carbon fiber that are classified based on raw material may be employed as the carbon fiber to be compounded into the resin composition. The baking temperature is not limited, and thus either graphitized material baked at 2,000° C. or more and carbonized material baked at 1,000-1,500° C. may be employed. Examples of the milled fiber, which is commercially available, employed in the present invention include KRECA M-101S, M-101F, M107T, and M-201S produced by Kureha Corporation. Further, examples of the PAN based carbon fiber include HT M800 160MU and HT M100 40MU produced by TEIJIN LIMITED and Trayca MLD-30 and MLD-300 produced by Toray Industries, Inc.

The carbon fiber might contain sulfur as an impurity. In a case of the pitch based carbon fiber, the pitch, which is a raw material, contains sulfur as an impurity. Further, in a case of the PAN based carbon fiber, sulfur might remain after a surface treatment using sulfur.

The resin composition preferably contains 5-25 vol % of total of at least one solid lubricant selected from among the PTFE resin and the graphite, relative to the resin composition. In a case in which the compound rate of the total of at least one solid lubricant selected from among the PTFE resin and the graphite is less than 5 vol %, the friction and wear performance is hardly improved in the non-lubricating condition, while in a case in which the compound rate of the total of at least one solid lubricant selected from among the PTFE resin and the graphite is more than 25 vol %, the tensile extension property of the resin composition might be deteriorated. Deterioration of the tensile extension property might cause the break of the piston ring when radially enlarged to be mounted to the annular groove of the piston. The compound rate of the solid lubricant is more preferably 10-20 vol %.

The PTFE resin is a solid lubricant that improves the friction and wear performance of the resin composition in the non-lubricating condition. As the PTFE resin, any of molding powder obtained through a suspension polymerization method, fine powder obtained through an emulsion polymerization method, and recycled PTFE may be employed. In order to stabilize the flowability of the resin composition, it is preferable to employ the recycled PTFE that is hardly fibered by the shearing in molding and hardly increases the melt viscosity. The recycled PTFE denotes heat-treated powder (heat hysteresis has been applied thereto), or powder that has been irradiated with γ rays or electron rays. Examples of the recycled PTFE include: powder formed by heat-treating the molding powder or the fine powder; powder formed by irradiating the powder formed by heat-treating the molding powder or the fine powder, with γ rays or electron rays; powder formed by grinding a molding body of the molding powder or the fine powder; powder formed by irradiating the powder formed by grinding a molding body of the molding powder or the fine powder, with γ rays or electron rays; powder formed by irradiating the molding powder or the fine powder with γ rays or electron rays; and powder formed by irradiating the molding powder or the fine powder with γ rays or electron rays and then heat-treated. The median particle diameter of the PTFE resin is not especially limited, however the median particle diameter is preferably 10-50 μm.

Examples of the PTFE resin, which is commercially available, employed in the present invention, include KTL-610, KTL-450, KTL-350, KTL-8N, and KTL-400H produced by KITAMURA LIMITED; Teflon (registered trademark) 7-J and TLP-10 produced by Chemours-Mitsui Fluoroproducts Co., Ltd.; Fluon G163, L150J, L169J, L170J, L172J, L173J, and L182J produced by AGC Inc.; Polyflon M-15 produced by DAIKIN INDUSTRIES, LTD.; and Dyneon TF9205 and TF9207 produced by 3M Japan Limited. Further, PTFE resin modified by a perfluoroalkylether group, a fluoroalkyl group, or a side chain group containing other fluoroalkyl may be employed. The PTFE resins irradiated with γ rays or electron rays among the above-described PTFE resins correspond to KTL-610, KTL-450, KTL-350, KTL-8N, and KTL-8F produced by KITAMURA LIMITED; and Fluon L169J, L170J, L172J, L173J, and L182J produced by AGC Inc.

The graphite is a solid lubricant that improves the friction and wear performance in the non-lubricating condition, similar to the PTFE resin. Any of natural graphite and artificial graphite may be employed as the graphite. A shape of a particle may be a scaly shape, a granular shape, a spherical shape, or the like. An example of the natural graphite includes ACP produced by Nippon Graphite Industries, Co., Ltd. Examples of the artificial graphite include KS-6, KS-25, and KS-44 produced by Imerys Graphite & Carbon Japan Ltd. The median particle diameter of the graphite may be, but not especially limited thereto, preferably 3-50 μm, and more preferably 10-30 μm. In a case in which the median particle diameter of the graphite is more than 50 μm, the tensile extension property of the resin composition might be deteriorated. Deterioration of the tensile extension property of the resin composition might cause the break of the piston ring when radially enlarged to be mounted to the annular groove of the piston. Each of the natural graphite and the artificial graphite contains sulfur as an impurity.

The median particle diameter ($D_{50}$) of each of the PTFE resin and the graphite employed in the present invention is the particle diameter of a point of which the accumulated value is 50% in an accumulated distribution as the particle diameter distribution and is measured by, for example, a particle diameter distribution measurement device using a laser light scattering method.

In the above-described resin composition, the carbon fiber and the above-described solid lubricant may be combined and compounded, or only one of the carbon fiber and the solid lubricant may be compounded.

A well-known additive for resin may be compounded into the above-described resin composition to such an extent that does not deteriorate an advantage of the present invention. Examples of the additive include an inorganic matter (mica, talc, calcium carbonate, and boron nitride), whisker (calcium carbonate, and potassium titanate), a coloring agent (carbon black, iron oxide, and titanium oxide), and other resin component. The above-described additive for resin might contain sulfur as an impurity. For example, the carbon black contains the sulfur that is bonded to polycyclic aromatic hydrocarbon.

Further, resin having the glass transition point higher than that of the PEEK resin may be compounded at the compound rate less than that of the PEEK resin, into the above-described resin composition to such an extent that does not deteriorate an advantage of the present invention. This configuration prevents the elastic modulus from decreasing in a temperature range higher than the glass transition point (143° C.) of the PEEK resin. Examples of such resin include thermoplastic polyimide resin, thermosetting polyimide resin, polyamide-imide resin, and polyether-imide resin. The compound rate of the resin may be, for example, 1-10 vol % relative to the whole of the resin composition.

It is preferable that the carbon fiber, the PTFE resin, the graphite, and the other additives compounded into the resin composition employed in the present invention do not intentionally contain sulfur element (except containing the sulfur element as an impurity). Specifically, it is preferable that the resin composition does not contain PPS resin and molybdenum disulfide. Further, the content of the sulfur element as an impurity is preferably 0.1 mass % or less relative to the whole of the resin composition (100 mass %), and more preferably 0.025 mass % (250 ppm) or less. The content of the sulfur element is measured by, for example, Inductively Coupled Plasma Mass Spectrometry (ICP-MS). A triple quadrupole inductively coupled plasma mass spectrometer (ICP-MS/MS) that executes the analysis with higher precision may be also employed. An example of a preparation method before the analysis includes a method that filters a decomposed solution obtained through acid decomposition by a microwave sample preparation device and that obtains supernatant as an analysis sample. Whether or not the decomposition residue contains the sulfur element may be checked by a known analysis method using an X-ray fluorescence analyzer.

As described above, an especially preferable aspect of the resin composition according to the present invention contains: the PEEK resin, as a base resin, having the melt viscosity of 270-550 Pa·s at the shear rate of 1,000/s and the temperature of 400° C. measured by a measuring method defined in ISO 11443; 5-25 vol % of the carbon fiber relative to the whole of the resin composition; and 5-25 vol % of the solid lubricant (at least one of the PTFE resin and the graphite) relative to the whole of the resin composition, wherein the average fiber length of the carbon fiber is 20-200 μm. Further, the resin composition may preferably contain 10-20 vol % of the carbon fiber relative to the whole of the resin composition, and 10-20 vol % of the PTFE resin relative to the whole of the resin composition.

After the materials that form the above-described resin composition are mixed as needed using a Henschel mixer, a ball mixer, a ribbon blender or the like, the materials are melt-kneaded using a melt extruder such as a twin-screw melt extruder to obtain molding pellets. Further, in the melt-kneading by a twin-screw melt extruder or the like, a side feed may be employed for charging the carbon fiber, the PTFE resin, the graphite, and the above-described additives for resin. The piston ring is obtained by means of injection molding using these molding pellets. The piston ring having a specified shape may be formed through an additional processing or the whole processing on the injection-molded body. A compression molding, an injection molding, or an extrusion molding may be selected as the molding method. Of these molding methods, the injection molding is preferable.

The piston ring according to the present invention is preferably subjected to a heat treatment before or after the injection molding. Specifically, the piston ring is preferably (1) an injection-molded body formed by the injection molding of the heat-treated molding pellets, or (2) a heat-treated body that is formed by heat-treating the injection-molded body formed by the injection molding of the molding pellets. In this manner, the heat treatment is executed before or after the injection molding, so that the content of the sulfur element in the resin composition can be decreased. As a result, a sulfur containing gas generation amount in a hydrogen atmosphere can be decreased, compared to a piston ring that does not subjected to the heat treatment.

The content of the sulfur element in the piston ring having the above-described configuration (1) or (2) is preferably 0.1 mass % or less relative to the whole of the resin composition (100 mass %), more preferably 0.05 mass % or less, further more preferably 0.025 mass % (250 ppm) or less, and especially more preferably 0.020 mass % (200 ppm) or less.

The timing of the heat treatment is not especially limited, and thus the heat treatment may be executed at any time between forming the molding pellet and forming the piston ring. For example, in a case in which the heat treatment is executed after the injection molding, the heat treatment may be applied to the injection-molded body or applied to the injection-molded body that has been machined.

The maximum temperature of the heat treatment is preferably 150-330° C. (more preferably 200-250° C.). In a case in which the maximum temperature is less than 150° C., the sulfur containing gas is hardly decreased. In a case in which the maximum temperature is more than 250° C., the piston ring might be deformed when the heat treatment is executed after the injection molding. Further, the maximum temperature is preferably higher than the use temperature of the piston ring, more preferably higher than the use temperature by 30° C. or more. The duration time for keeping the maximum temperature is not especially limited, however the duration time may be, for example, 4-8 hours. The heat treatment is effective to decrease the sulfur in the piston ring, and thus the sulfur containing gas generated during the use of the piston ring is decreased in advance. In a case in which a filling material containing the sulfur as an impurity, such as the carbon fiber, the graphite, and the carbon black is compounded into the PEEK resin composition, the heat treatment is especially effective to eliminate the active sulfur in the filling material in advance.

When the Differential Scanning calorimetry (DSC) is executed on the piston ring formed by the injection molding or the piston ring formed by machining the injection-molded body after the heat treatment is applied to the piston ring, an endothermic peak (hereinafter, the endothermic peak is referred to as an endothermic peak due to heat hysteresis) appears in a temperature increasing process. The endothermic peak does not appear on the piston ring that does not subjected to the heat treatment. The endothermic peak due to the heat hysteresis appears at a temperature equivalent to the maximum temperature or a temperature slightly higher (within +20° C.) than the maximum temperature of the heat treatment. Accordingly, the maximum temperature of the heat treatment can be assumed. In the piston ring according to the present invention, the endothermic peak due to the heat hysteresis appears preferably in a range of 150-330° C. in the temperature increasing process of the Differential Scanning calorimetry (more preferably in a range of 200-250° C.) caused by the heat treatment. In this case, the piston ring has the endothermic peak in a range of 150-330° C., in addition to the endothermic peak due to the melt point (approximately 343° C.) of the PEEK resin. The Differential Scanning calorimetry may be executed under a condition of, for example, the temperature increasing rate of 15° C./minute and within nitrogen gas.

The heat treatment may be executed in atmosphere. This configuration eliminates the need for the heat treatment in special atmosphere such as exposure to the hydrogen atmosphere (a desulfurizing treatment).

EXAMPLE

The present invention is further specifically described with reference to the following Examples. However, the present invention is not limited to the following Examples.

Examples 1 to 6, Comparative Examples 1 and 2

An injection-molded body having a size of φ×20 mm was formed by the injection molding using the PEEK resin composition with the compound rate (vol %) shown in Table 1. The injection-molded body subjected to the heat treatment in atmosphere at the maximum temperature of 220° C. for four hours was machined to form a pin test piece having a size of φ3×13 mm.

The raw materials employed in the PEEK resin composition are described below. The melt viscosity of each of PEEK-1 to PEEK-5 is measured based on a measuring method defined in ISO 11443 at the shear rate of 1,000/s and the temperature of 400° C.

(1) PEEK-1
90P (melt viscosity of 90 Pa·s) produced by Victrex Japan Inc.

(2) PEEK-2
150P (melt viscosity of 130 Pa·s) produced by Victrex Japan Inc.
(3) PEEK-3
380P (melt viscosity of 300 Pa·s) produced by Victrex Japan Inc.
(4) PEEK-4
450P (melt viscosity of 350 Pa·s) produced by Victrex Japan Inc.
(5) PEEK-5
650P (melt viscosity of 500 Pa·s) produced by Victrex Japan Inc.
(6) CF-1
Kreca M201S (average fiber length of 150 µm) produced by Kureha Corporation
(7) CF-2
Trayca MLD-30 (average fiber length of 30 µm) produced by Toray Industries, Inc.
(8) CF-3
Kreca M107T (average fiber length of 400 µm) produced by Kureha Corporation
(9) PTFE resin
KTL-450 (median particle diameter of 22 µm) produced by KITAMURA LIMITED
(10) Graphite
CGB-20 (median particle diameter of 20 µm) produced by Nippon Graphite Industries, Co., Ltd.

As shown in Table 1, each of Examples 1 to 3, 5 and 6 employs a resin composition formed of the PEEK resin having a specified melt viscosity, the carbon fiber, and the PTFE resin (without graphite). Example 4 employs a resin composition formed of the PEEK resin having a specified melt viscosity, the carbon fiber, the PTFE resin, and the graphite.

Figure 3:
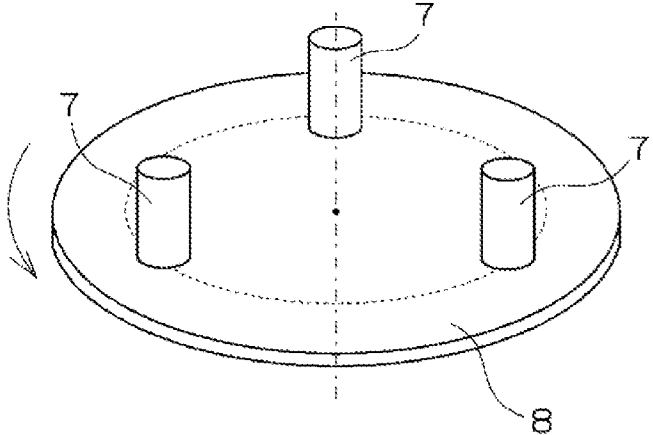
FIG. 3 is a general view of a pin-on-disk tester.

Friction and Wear Test
The friction and wear test was executed on the obtained pin test piece using a pin-on-disk tester shown in FIG. 3. As shown in FIG. 3, test faces of three pin test pieces 7 were pressed on a surface of a rotary disk 8 of the tester at surface pressure described below, and then the rotary disk 8 was rotated at a room temperature. A specific test condition is described below. The material of the rotary disk 8 is SUS304. The test condition is considered as a use condition of the piston ring in the hydrogen gas reciprocating compressor.

Test condition
Rotation speed: 4.8 m/minute
Surface pressure: 4 MPa
Lubrication: None (dry)
Temperature: Room temperature
Time: 50 hours
A change amount of the height of each of the pin test pieces 7 after the test from the original height was measured, and a specific wear rate was calculated based on the average value of the three change amounts. Further, a wear damage of a mating material (the rotary disk 8) was visually checked. The result is shown in Table 1.

TABLE 1

| | | Example 1 | Example 2 | Example 3 | Example 4 | Example 5 | Example 6 | Comparative example 1 | Comparative example 2 |
|---|---|---|---|---|---|---|---|---|---|
| Compound rate (vol %) | (1) PEEK-1 (melt viscosity 90 Pa · s) | — | — | — | — | — | — | 80 | — |

TABLE 1-continued

| | | Example 1 | Example 2 | Example 3 | Example 4 | Example 5 | Example 6 | Comparative example 1 | Comparative example 2 |
|---|---|---|---|---|---|---|---|---|---|
| | (2) PEEK-2 (melt viscosity 130 Pa · s) | — | — | — | — | — | — | — | 80 |
| | (3) PEEK-3 (melt viscosity 300 Pa · s) | 80 | — | — | — | — | — | — | — |
| | (4) PEEK-4 (melt viscosity 350 Pa · s) | — | 80 | 70 | 70 | 80 | — | — | — |
| | (5) PEEK-5 (melt viscosity 500 Pa · s) | — | — | — | — | — | 80 | — | — |
| | (6) CF-1 (average fiber length 150 μm) | 10 | 10 | 25 | — | — | 10 | 10 | 10 |
| | (7) CF-2 (average fiber length 30 μm) | — | — | — | 5 | — | — | — | — |
| | (8) CF-3 (average fiber length 400 μm) | — | — | — | — | 10 | — | — | — |
| | (9) PTFE resin | 10 | 10 | 5 | 10 | 10 | 10 | 10 | 10 |
| | (10) Graphite | — | — | — | 15 | — | — | — | — |
| Evaluation | Specific wear rate × $10^{-8}$ mm$^3$/N · m | 77 | 41 | 29 | 46 | 79 | 19 | 413 | 200 |
| | Wear damage of mating material | No | No | No | No | Yes | No | No | No |

As shown in Table 1, in each of Examples 1 to 6, the specific wear rate is 19-79×$10^{-8}$ mm$^3$/N·m. The specific wear rates of Comparative examples 1 and 2 that employ the PEEK resin having the melt viscosity of 200 Pa·s or less are 413×$10^{-8}$=3/N·m and 200×$10^{-8}$ mm$^3$/N·m, respectively, which are inferior to Examples 1 to 6 in the wear resistance. In Example 5 (the average fiber length of the carbon fiber is 400 μm), the wear damage is slightly caused on the mating material.

Figure 4:
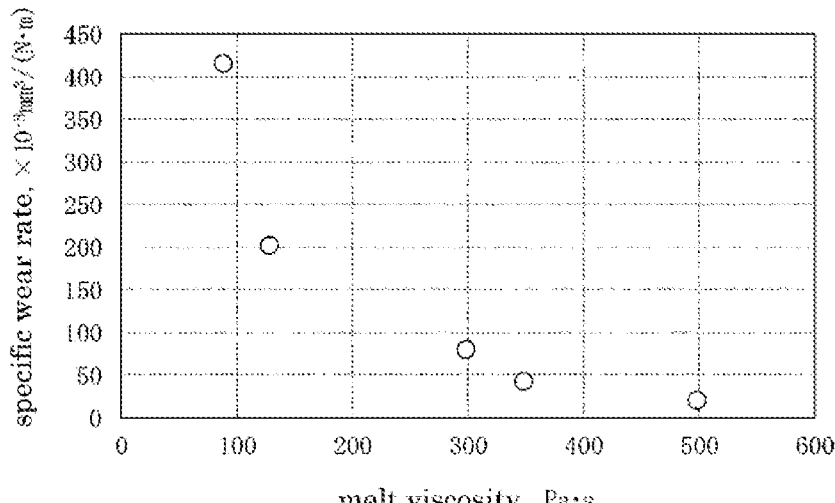
FIG. 4 is a graph showing a relation between a melt viscosity and a specific wear rate of the PEEK resin.

A relationship between the melt viscosity of the PEEK resin and the specific wear rate of Examples 1, 2 and 6, and Comparative examples 1 and 2 (a combination of 10 vol % of CF-1 and 10 vol % of the PTFE resin) is shown in FIG. 4. As shown in FIG. 4, the specific wear rate drastically increases as the melt viscosity of the PEEK resin is less than a specific value. The present invention sets the melt viscosity of the PEEK resin in a range of 200-550 Pa·s, so that the piston ring having small specific wear rate and superior wear resistance is obtained.

A quantitative analysis of the sulfur element was executed on the injection-molded body used for forming the pin test piece of Example 1 before and after the heat treatment at the maximum temperature of 220° C. for four hours was applied thereto. The injection-molded body was frozen and crashed and then a decomposed solution obtained through acid decomposition thereof using a microwave sample prepara-tion device was filtered, so that supernatant was obtained as an analysis sample. According to the analysis executed on the analysis sample using ICP-MS/MS, the contents of the sulfur are 220 ppm before the heat treatment and 150 ppm after the heat treatment. It was checked using the X-ray fluorescence analyzer that the decomposition residue does not contain the sulfur element.

Figure 5:
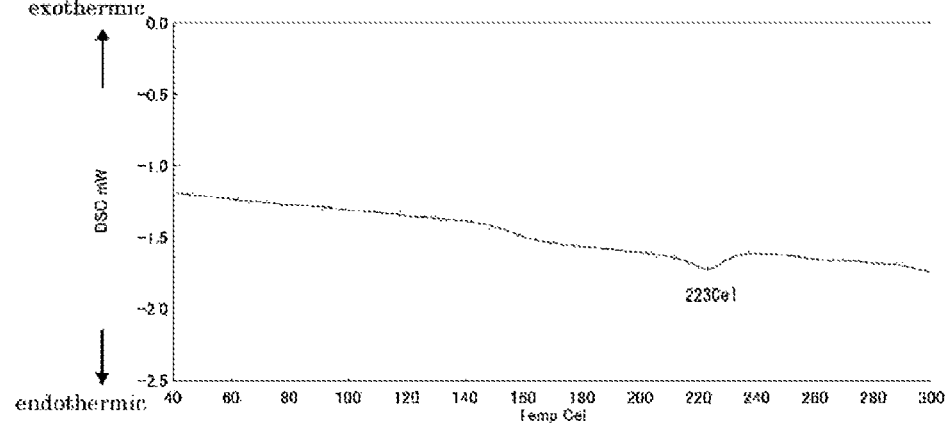
FIG. 5 is a graph showing a result of the differential scanning calorimetry.

Further, an injection-molded body of a resin composition containing the PEEK resin as a main component was sepa-rately subjected to the heat treatment at the maximum temperature of 210° C. and the duration time of four hours keeping the maximum temperature. An example of the result of the Differential Scanning calorimetry (DSC) after the heat treatment is shown in FIG. 5. As shown in FIG. 5, the endothermic peak that does not appear on the injection-molded body that does not subjected to the heat treatment, was observed at 223° C. in the temperature increasing process.

In this manner, the piston rings of the above-described Examples have the endothermic peak due to the heat hys-teresis in a range of 150-330° C. in the temperature increas-ing process of the Differential Scanning calorimetry, in response to the maximum temperature of the heat treatment process.

INDUSTRIAL APPLICABILITY

The piston ring according to the present invention is preferably applied to a piston ring of a reciprocating compressor that compresses gas. The piston ring has superior wear resistance and causes less wear damage of a cylinder. Further, the piston ring according to the present invention can decrease generation of outgas containing sulfur element and thus is applied to a hydrogen gas reciprocating compressor that needs to avoid contamination due to the sulfur.

REFERENCE SIGNS LIST

1: piston ring
2: compressing mechanism
3: cylinder
4: piston
5: piston rod
6: compression chamber
7: pin test piece
8: rotary disk
The invention claimed is:

1. A piston ring used in a hydrogen gas reciprocating compressor that compresses hydrogen gas, wherein:
the piston ring is formed of a resin composition containing polyetheretherketone resin as a main component;

where melt viscosity of the polyetheretherketone resin measured at a shear rate of 1,000/s and a temperature of 400° C. is 270-550 Pa·s based on a measuring method defined in ISO 11443,
the piston ring is a heat-treated body of an injection-molded body of the resin composition,
the piston ring has an endothermic peak in a range of 150-330° C., in addition to the endothermic peak due to a point at which the polyetheretherketone resin melts in a differential scanning calorimetry,
having a sulfur content of 250 ppm or less,
the resin composition does not contain polyphenylene sulfide resin, and contains 5-25 vol % of carbon fiber and 5-25 vol % of a solid lubricant, relative to the volume of the resin composition,
the solid lubricant comprises at least one component selected from polytetrafluoroethylene resin and graphite, and
the carbon fiber has an average fiber length of 20-200 μ.
2. The piston ring as defined in claim 1, wherein:
said heat treated body of an injection molded body of the resin composition has a content of sulfur element that is smaller than the content of the sulfur element in the injection-molded body.

* * * * *